(12) United States Patent
Liu (10) Patent No.: US 8,855,574 B2
(45) Date of Patent: Oct. 7, 2014

(54) RADIO FREQUENCY CALIBRATION METHOD AND APPARATUS FOR MOBILE TERMINAL

(75) Inventor: Cheng Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/881,743

(22) PCT Filed: Feb. 9, 2011

(86) PCT No.: PCT/CN2011/070900
§ 371 (c)(1),
(2), (4) Date: Apr. 26, 2013

(87) PCT Pub. No.: WO2012/055185
PCT Pub. Date: May 3, 2012

(65) Prior Publication Data
US 2013/0225091 A1 Aug. 29, 2013

(30) Foreign Application Priority Data
Oct. 27, 2010 (CN) .......................... 2010 1 0523287

(51) Int. Cl.
*H04B 17/00* (2006.01)
*H04W 24/02* (2009.01)
*H04W 52/52* (2009.01)

(52) U.S. Cl.
CPC ........... *H04W 24/02* (2013.01); *H04B 17/0062* (2013.01); *H04W 52/52* (2013.01); *H04B 17/0045* (2013.01); *H04B 17/0082* (2013.01); *H04B 17/001* (2013.01)
USPC ................. 455/67.11; 45/67.4; 45/69; 45/91; 45/226.1

(58) Field of Classification Search
CPC .................................................. H04B 17/0062
USPC .................................. 455/67.4, 69, 91, 226.1
See application file for complete search history.

(56) References Cited

U.S. PATENT DOCUMENTS

| 6,832,075 | B1 * | 12/2004 | Henry, Jr. ................... 455/67.14 |
| 2006/0114075 | A1 | 6/2006 | Janosevic et al. |
| 2006/0132058 | A1 * | 6/2006 | Choi ............................. 315/210 |

FOREIGN PATENT DOCUMENTS

| CN | 101188463 A | 5/2008 |
| CN | 101383666 A | 3/2009 |

(Continued)

OTHER PUBLICATIONS

English abstract of CN101188463A, May 28, 2008.

(Continued)

*Primary Examiner* — Hsin-Chun Liao
(74) *Attorney, Agent, or Firm* — Porter Wright Morris & Arthur LLP (57) ABSTRACT

The disclosure provides a radio frequency calibration method for a mobile terminal, including: setting a parameter required for radio frequency calibration of the mobile terminal (201); obtaining $P_{PDM}$ values of power control signals and actual output power (P) values of the mobile terminal corresponding to the $P_{PDM}$ values by using different scanning steps according to linearity of a power curve, or, selecting, by using different selection intervals, part of $P_{PDM}$ values and P value corresponding to the part of $P_{PDM}$ values from calibration data obtained by fine scanning (202); and converting the obtained P values into $P_{AGC}$ values recognizable by the mobile terminal, and storing the $P_{AGC}$ values and the $P_{PDM}$ values corresponding to the $P_{AGC}$ values into a memory of the mobile terminal (203). The disclosure further discloses a radio frequency calibration apparatus for a mobile terminal. Through the solution of the disclosure, the finally obtained calibration data are more approximate to the memory space of the mobile terminal in length, so that the mobile terminal can transmit correct power by querying the calibration data when transmitting power to the outside, thereby reflecting the output characteristics of the mobile terminal more truly and improving the radio frequency output index, such as inner-loop power control, of the mobile terminal.

12 Claims, 2 Drawing Sheets

(56) References Cited

FOREIGN PATENT DOCUMENTS

| CN | 101771477 A | 7/2010 |
|---|---|---|
| EP | 2334123 A1 | 6/2011 |
| FR | 2 924 544 A1 | 6/2009 |
| WO | WO 2008/134404 A2 | 11/2008 |

OTHER PUBLICATIONS

English abstract of CN101771477A, Jul. 7, 2010.
English abstract of CN101383666A, Mar. 11, 2009.
Supplementary European Search Report, European patent application No. EP 11 83 5459, Dec. 18, 2013.

* cited by examiner

RADIO FREQUENCY CALIBRATION METHOD AND APPARATUS FOR MOBILE TERMINAL

TECHNICAL FIELD

The disclosure relates to the field of radio frequency calibration of a mobile terminal, in particular to a radio frequency calibration method and apparatus for a mobile terminal.

BACKGROUND

Generally, a mobile terminal must be subjected to radio frequency calibration before leaving the manufacturer, wherein the radio frequency calibration includes calibration of a radio frequency transmitter. In the related art, the radio frequency transmitter is located in the mobile terminal, and during the calibration performed via the radio frequency transmitter, a calibration program in a Personnel Computer (PC) transmits a power control signal, which can be represented by a $P_{PDM}$ value, to the radio frequency transmitter in the mobile terminal through a Universal Serial Bus (USB) or other serial ports, so as to control power of a radio frequency signal transmitted from the radio frequency transmitter. The radio frequency signal from the radio frequency transmitter is transmitted to an integrated tester through a radio frequency coaxial line. The calibration program controls the integrated tester to measure and acquire a precise power value of the radio frequency signal, and then the calibration program gradually increases or decreases the $P_{PDM}$ value according to a certain step, and synchronously measures the power of the radio frequency signal transmitted from the radio frequency transmitter to finally obtain a series of power values corresponding to the $P_{PDM}$ values.

Because a linear Power Amplifier (PA) adopted by the mobile terminal is characterized by multi-level gain, the scanning calibration process above will be performed in stages. Specifically, if the gain of the PA is of N levels, the $P_{PDM}$ scanning range corresponding to the gain of each level is: $(P_{PDM[0](start)} \sim P_{PDM[0](stop)})$, $(P_{PDM[1](start)} \sim P_{PDM[1](stop)})$, ..., $(P_{PDM[N-1](start)} \sim P_{PDM[N-1](stop)})$, wherein N is an integer more than or equal to 1, the output power of the radio frequency transmitter corresponding to the $P_{PDM}$ start and stop values would be better to cover a dynamic range of the gain of the level, the $P_{PDM}$ scanning range of each stage corresponds to one $P_{PDM}$ scanning step length (also referred to as step), here, step is an integer more than or equal to 1, and scanning is performed in stages according to the gain levels of the PA so as to finally measure and obtain the power values in stages.

The series of power values obtained by calibration are converted into data recognizable by the mobile terminal in a scale conversion way, wherein the data recognizable by the mobile terminal can be represented by $P_{AGC}$ value. The $P_{AGC}$ value is stored into a pre-allocated mobile terminal memory with a fixed length for the gain of each level. Meanwhile, the $P_{PDM}$ value corresponding to the $P_{AGC}$ value is also stored into the mobile terminal memory. In this way, the mobile terminal memory has a table of correspondence between each gain level working mode of the PA and the corresponding output power of the transmitter, and this table is generally referred to as a linear table, including a series of corresponding relationships between the $P_{PDM}$ value and the $P_{AGC}$ value. When transmitting power to the outside, the mobile terminal queries the linear table to transmit the correct power. The shorter the scanning step of the $P_{PDM}$ in the calibration is, the finer the obtained linear table is, and the more accurate the power from the mobile terminal is. The power range of the linear table is required to cover the dynamic range of the normal working output power of the mobile terminal.

Figure 1:
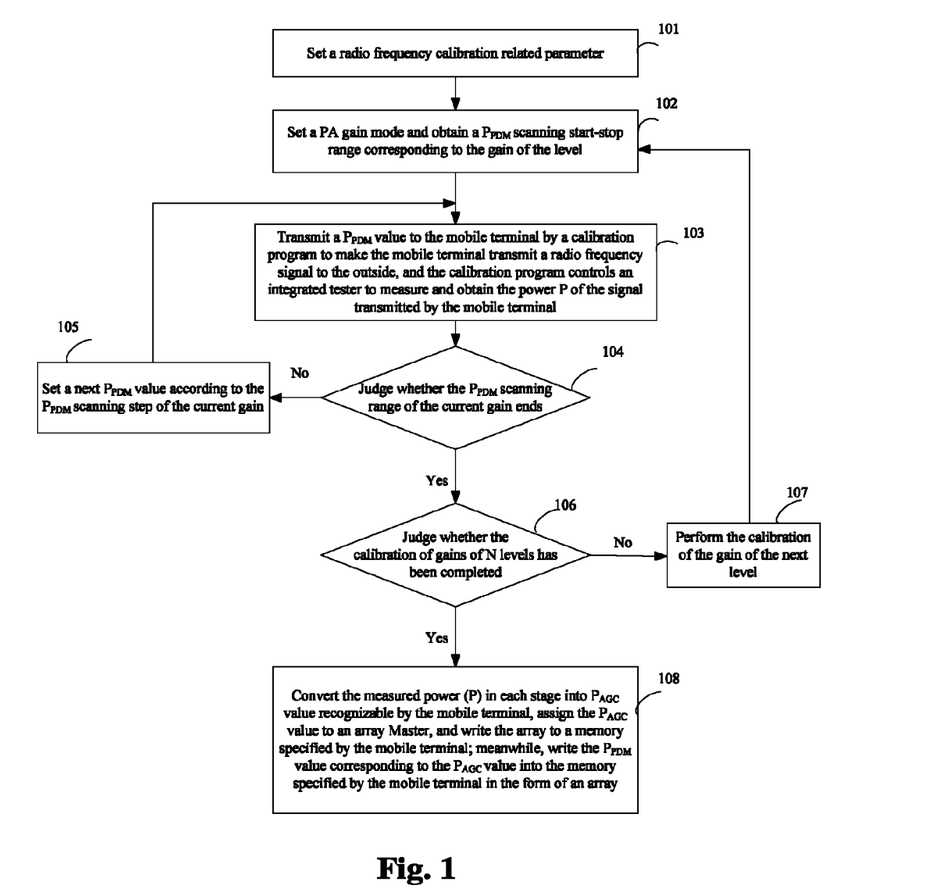
FIG. 1 is a flowchart of a radio frequency calibration method for a mobile terminal in the related art.

Based on what described above, the radio frequency calibration method for the transmitter in the related art mainly includes the following steps.

Step 101: Radio frequency calibration related parameters are set.

In the step, it is required to set a PA gain level (N), a mode of the gain of each level (R[i]), $P_{PDM}$ scanning start-stop range $(P_{PDM\,(start)}, P_{PDM\,(stop)})$ corresponding to the gain of each level, and $P_{PDM}$ scanning step (Step [i]) corresponding to the gain of each level, wherein the $P_{PDM}$ scanning start-stop range corresponding to the gain of each level may be specifically set with reference to documents related to a platform solution of the mobile terminal, platform solutions of different manufactures correspond to different $P_{PDM}$ scanning start-stop ranges, and the scanning step corresponding to the gain of each level may also be different, wherein N is a natural number and i represents different gain levels, i=0, 1, 2 ... N−1.

Step 102: The gain mode of the PA is set and the $P_{PDM}$ scanning start-stop range corresponding to the gain of each level is obtained.

Step 103: A $P_{PDM}$ value is transmitted to the mobile terminal by a calibration program to make the mobile terminal transmit a radio frequency signal to the outside, and the calibration program controls an integrated tester to measure and obtain the power P of the signal transmitted by the mobile terminal.

Step 104: It is judged whether the $P_{PDM}$ scanning range of the current gain ends, if not, Step 105 is executed; otherwise, Step 106 is executed.

Step 105: A next $P_{PDM}$ value is set according to the $P_{PDM}$ scanning step of the current gain, and return to Step 103.

Step 106: It is judged whether the calibration of the gains of N levels has been completed, if not, Step 107 is executed; otherwise, Step 108 is executed.

Step 107: The calibration of the gain of the next level is performed and Step 102 is circularly executed.

Step 108: The measured power (P) of each stage is converted into a $P_{AGC}$ value recognizable by the mobile terminal. The $P_{AGC}$ value is assigned to an array (Master), and written into a memory specified by the mobile terminal. Meanwhile, the $P_{PDM}$ value corresponding to the $P_{AGC}$ value is written into a memory specified by the mobile terminal in the form of an array.

In the related art, the mobile terminal has a memory space of fixed length, so the $P_{PDM}$ array and the Master array written into the memory of the mobile terminal are fixed in size. One of the following three circumstances would occur when the size L of the $P_{PDM}$ array and the Master array finally obtained by calibration in accordance with the above method is compared with the size L' of the space allocated to store the $P_{PDM}$ data and the Master data in the memory, where L=round $((P_{PDM(stop)}-P_{PDM(start)}/\text{Step})$.

The first circumstance is L=L', this is the most ideal circumstance.

The second circumstance is L>L', the power range of the linear table written into the memory of the mobile terminal cannot cover the dynamic range of the normal working output power of the mobile terminal, as a result, the transmission index of the mobile terminal will be affected.

The third circumstance is L<L', the $P_{PDM}$ scanning is not fine and the memory space of the mobile terminal is not used up, under such circumstance, the transmission index of the mobile terminal will not be affected if the linearity of the PA or the radio frequency transmission of the mobile terminal is excellent, and will be affected if the linearity is not good.

Generally, the second circumstance may be solved by increasing the step, and the third circumstance may be solved by decreasing the step.

However, in actual application, a lot of projects and experiments show that: because the $P_{PDM}$ scanning step of each stage is constant, the final result is either the second circumstance turning into the third circumstance, or the third circumstance turning into the second circumstance no matter how the step is adjusted, and it is almost impossible to achieve the first ideal circumstance. Whereas, under the third circumstance, in one aspect, the calibration scanning is not fine due to the non-ideal linearity of the PA or the non-ideal linearity of the radio frequency transmission of the mobile terminal, as a result, the transmission index, particularly an inner-loop power control index, of the mobile terminal is affected; and in another aspect, in actual application, the L is only about ⅔ or ¾ as long as L', as a result, the memory space of the linear table is wasted.

SUMMARY

In view of these, the disclosure provides a radio frequency calibration method and apparatus for a mobile terminal, so as to fully utilize the memory space and improve the radio frequency transmission index of the mobile terminal.

The technical solution of the disclosure is implemented as follows.

The radio frequency calibration method for the mobile terminal includes: setting a parameter required for radio frequency calibration of the mobile terminal, and further includes:

obtaining $P_{PDM}$ values of power control signals and actual output power (P) values of the mobile terminal corresponding to the $P_{PDM}$ values by using different scanning steps according to linearity of a power curve, or, selecting, by using different selection intervals, part of $P_{PDM}$ values and P values corresponding to the part of $P_{PDM}$ values from calibration data obtained by fine scanning; and converting the obtained P values into $P_{AGC}$ values recognizable by the mobile terminal, and storing the $P_{AGC}$ values and the $P_{PDM}$ values corresponding to the $P_{AGC}$ values into a memory of the mobile terminal.

In the above solution, the set parameter required for the radio frequency calibration includes: a gain level (N), a working mode of a gain of each level (RN), a $P_{PDM}$ scanning start-stop range ($P_{PDM}$[i] (start), $P_{PDM}$[i] (stop)) corresponding to the gain of each level, a $P_{PDM}$ scanning step (Step [i]) corresponding to the gain of each level, a power hot point range (HotPoint[k](start), HotPoint[k](stop)), and a power hot point $P_{PDM}$ scanning step (HotStep[k]); wherein N is a natural number, i represents different gain levels, i=0, 1, . . . N−1, and k represents an ordinal number of a power hot point and is a natural number.

In the above solution, using different scanning steps according to the linearity of the power curve is that: a $P_{PDM}$ scanning step changes along with change of the linearity of the power curve, and the better the linearity of the power curve is, the larger the $P_{PDM}$ scanning step is; and using different selection intervals according to the linearity of the power curve is: a $P_{PDM}$ selection interval changes along with the change of the linearity of the power curve, and the better the linearity of the power curve is, the larger the $P_{PDM}$ selection interval is.

In the above solution, obtaining the $P_{PDM}$ values and the P values corresponding to the $P_{PDM}$ values by using different scanning steps is: during scanning calibration, when a current $P_{PDM}$ value enters a power hot point range, if the current $P_{PDM}$ value enters the $k^{th}$ power hot point range for the first time, replacing a current $P_{PDM}$ scanning step with a $P_{PDM}$ scanning step of the $k^{th}$ power hot point, setting a flag as 1, and setting a $P_{PDM}$ value for the next calibration according to the $P_{PDM}$ scanning step of the $k^{th}$ power hot point; if the current $P_{PDM}$ value does not enter the $k^{th}$ power hot point range for the first time, setting the $P_{PDM}$ value for the next calibration according to the current $P_{PDM}$ scanning step; and when the current $P_{PDM}$ value does not enter the power hot point range, if the current $P_{PDM}$ value just goes out of the $k^{th}$ power hot point range, replacing a currently used $P_{PDM}$ scanning step of a power hot point with the $P_{PDM}$ scanning step of a current gain, setting the flag as 0, and setting the $P_{PDM}$ value for the next calibration according to the $P_{PDM}$ scanning step of the current gain; if the current $P_{PDM}$ value does not just go out of the $k^{th}$ power hot point range, setting the $P_{PDM}$ value for the next calibration according to the current $P_{PDM}$ scanning step.

In the above solution, selecting the part of $P_{PDM}$ values by using different selection intervals is:

during scanning calibration, performing fine scanning calibration at first, and obtaining a pair of $P_{PDM}$ value and P value from a series of calibration data obtained by the fine scanning, when a current $P_{PDM}$ value enters a power hot point range, if the current $P_{PDM}$ value enters the $k^{th}$ power hot point range for the first time, replacing a current $P_{PDM}$ selection interval with a $P_{PDM}$ selection interval of the $k^{th}$ power hot point, setting a flag as 1, and selecting the next pair of fine scanning $P_{PDM}$ value and P value according to the $P_{PDM}$ selection interval of the $k^{th}$ power hot point; if the current $P_{PDM}$ value does not enter the $k^{th}$ power hot point range for the first time, selecting the next pair of fine scanning $P_{PDM}$ value and P value according to the current $P_{PDM}$ selection interval; and when the current $P_{PDM}$ value does not enter the power hot point range, if the current $P_{PDM}$ value just goes out of the $k^{th}$ power hot point range, replacing a currently used $P_{PDM}$ selection interval of a power hot point with the $P_{PDM}$ selection interval of a current gain, setting the flag as 0, and selecting the next pair of fine scanning $P_{PDM}$ value and P value according to the $P_{PDM}$ selection interval of the current gain; if the current $P_{PDM}$ value does not just go out of the $k^{th}$ power hot point range, selecting the next pair of fine scanning $P_{PDM}$ value and P value according to the current $P_{PDM}$ selection interval.

In the above solution, the $P_{PDM}$ scanning step of the power hot point is less than the $P_{PDM}$ scanning step of the current gain; and the $P_{PDM}$ selection interval of the power hot point is less than the $P_{PDM}$ selection interval of the current gain.

The disclosure also provides a radio frequency calibration apparatus for a mobile terminal, includes: a setting module, a scanning module and a storing module, wherein the setting module is configured to set a parameter required for calibration of the mobile terminal;

the scanning module is configured to obtain $P_{PDM}$ values and P values corresponding to the $P_{PDM}$ values by using different scanning steps according to linearity of a power curve, or, select, by using different selection intervals, part of $P_{PDM}$ values and P values corresponding to the $P_{PDM}$ values from calibration data obtained by fine scanning; and the storing module is configured to convert the obtained P values into $P_{AGC}$ values recognizable by the mobile terminal, and store the $P_{AGC}$ values and the $P_{PDM}$ values corresponding to the $P_{AGC}$ values into a memory of the mobile terminal.

By the radio frequency calibration method and apparatus for the mobile terminal provided by the disclosure, the parameter required for the radio frequency calibration of the mobile terminal is set; $P_{PDM}$ values and P value corresponding to the $P_{PDM}$ values are obtained by using different scanning steps according to the linearity of a power curve, or, part of $P_{PDM}$ values and P values corresponding to the part of $P_{PDM}$ values are selected, by using different selection intervals, from the calibration data obtained by fine scanning; and the obtained P values are converted into $P_{AGC}$ values recognizable by the mobile terminal, and the $P_{AGC}$ values and the $P_{PDM}$ values corresponding to the $P_{AGC}$ values are stored into the memory of the mobile terminal. Through the solution of the disclosure, by repetitive debugging by different $P_{PDM}$ scanning steps or at different $P_{PDM}$ selection intervals, the finally obtained calibration data are more approximate to the memory space of the mobile terminal in length, so that the mobile terminal can transmit correct power by querying the calibration data when transmitting power to the outside, thereby reflecting the output characteristics of the mobile terminal more truly and improving the radio frequency output index, such as inner-loop power control, of the mobile terminal.

DETAILED DESCRIPTION OF THE EMBODIMENTS

The basic principle of the embodiments of the disclosure is: a parameter required for radio frequency calibration of a mobile terminal is set; $P_{PDM}$ values of a power control signals and corresponding actual output power (P) values of the mobile terminal are obtained by different scanning steps according to linearity of a power curve, or, part of $P_{PDM}$ values and the P values corresponding to the part of $P_{PDM}$ values are selected, by using different selection intervals, from calibration data obtained by fine scanning; and the obtained P values are converted into $P_{AGC}$ values recognizable by the mobile terminal, and the $P_{AGC}$ values and the $P_{PDM}$ value corresponding to the $P_{AGC}$ values are stored into a memory of the mobile terminal.

The points with the worst linearity in the radio frequency transmission of the mobile terminal are usually only near some power points in a dynamic range of a PA or near power switching points of a gain, and these points are uniformly referred to as power hot points in the embodiments of the disclosure.

Figure 2:
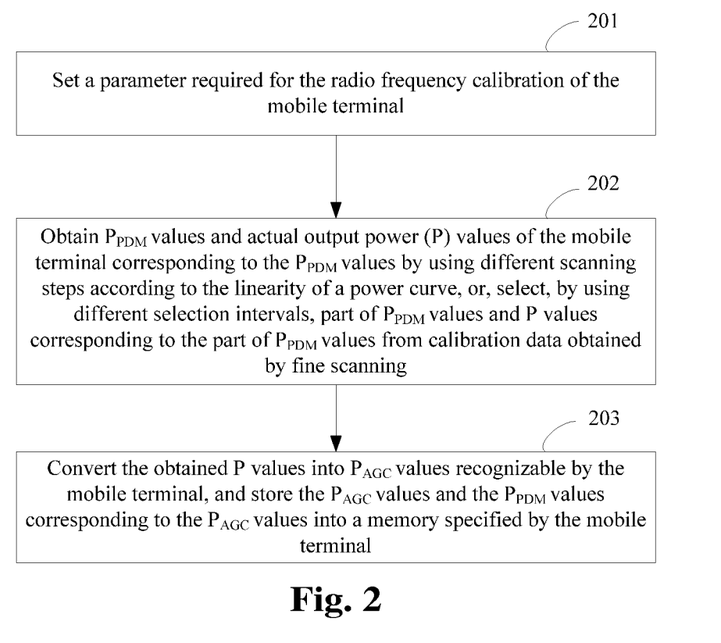
FIG. 2 is a flowchart of a radio frequency calibration method for a mobile terminal in an embodiment of the disclosure.

As shown in FIG. 2, the radio frequency calibration method for the mobile terminal includes the following steps.

Step 201: A parameter required for radio frequency calibration of the mobile terminal is set.

In the step, the set parameter required for the calibration includes: a gain level (N), a working mode of a gain of each level (R[i]), a $P_{PDM}$ scanning start-stop range ($P_{PDM}$ [i] (start), $P_{PDM}$ [i] (stop)) corresponding to the gain of each level, a $P_{PDM}$ scanning step (Step [i]) corresponding to the gain of each level, a power hot point range (HotPoint[k] (start), HotPoint[k](stop)), and a power hot point $P_{PDM}$ scanning step (HotStep[k]), wherein N is a natural number, i represents different gain levels, i=0, 1, ... N−1, and k represents an ordinal number of a power hot point and is a natural number.

Step 202: $P_{PDM}$ values and actual output power (P) values of the mobile terminal corresponding to the $P_{PDM}$ values are obtained by using different scanning steps according to linearity of a power curve, or, part of $P_{PDM}$ values and P values corresponding to the part of $P_{PDM}$ values are selected, by using different selection intervals, from calibration data obtained by fine scanning.

In the step, when the slope of the power curve of the gain of each level changes slightly, it means that the power curve has good linearity; and when the slope of the power curve of the gain of each level changes significantly, it means that the power curve has poor linearity.

In the step, the process that the calibrated $P_{PDM}$ values and the P values corresponding to the $P_{PDM}$ values are obtained by different $P_{PDM}$ scanning steps is specifically: the $P_{PDM}$ scanning step changes along with change of the linearity of the power curve, a larger $P_{PDM}$ scanning step is adopted where the linearity of the power curve is good, while a smaller $P_{PDM}$ scanning step is adopted where the linearity of the power curve is poor to obtain the calibrated $P_{PDM}$ values and the P values corresponding to the $P_{PDM}$ values. Generally, the better the linearity of the power curve is, the longer the $P_{PDM}$ scanning step is. Here, the larger and smaller $P_{PDM}$ scanning steps are a relative concept and can be set according to the specific condition of debugging, for example, when the smaller $P_{PDM}$ scanning step is set as 1, the larger $P_{PDM}$ scanning step may be set as more than 1.

Specifically, during a scanning calibration, when the current $P_{PDM}$ value enters a power hot point range, if the current $P_{PDM}$ value enters the $k^{th}$ power hot point range for the first time, the current $P_{PDM}$ scanning step is replaced with the $P_{PDM}$ scanning step of the $k^{th}$ power hot point, a flag is set as 1, and the $P_{PDM}$ value for the next calibration is set according to the $P_{PDM}$ scanning step of the $k^{th}$ power hot point; if the current $P_{PDM}$ value does not enter the $k^{th}$ power hot point range for the first time, the $P_{PDM}$ value for the next calibration is set according to the current $P_{PDM}$ scanning step; and when the current $P_{PDM}$ value does not enter the power hot point range, if the current $P_{PDM}$ value just goes out of the $k^{th}$ power hot point range, the currently used $P_{PDM}$ scanning step of a power hot point is replaced with the $P_{PDM}$ scanning step of the current gain, the flag is set as 0, and the $P_{PDM}$ value for the next calibration is set according to the $P_{PDM}$ scanning step of the current gain; if the current $P_{PDM}$ value does not just go out of the $k^{th}$ power hot point range, the $P_{PDM}$ value for the next calibration is set according to the current $P_{PDM}$ scanning step, wherein the $P_{PDM}$ scanning step of the power hot point is less than the $P_{PDM}$ scanning step of the current gain.

The process that the part of calibrated $P_{PDM}$ values and P values corresponding to the $P_{PDM}$ values are selected, by using different $P_{PDM}$ selection intervals, from the calibration data obtained by fine scanning is: the $P_{PDM}$ selection interval changes along with change of the linearity of the power curve, a larger $P_{PDM}$ selection interval is adopted where the linearity of the power curve is good, while a smaller $P_{PDM}$ selection interval is adopted where the linearity of the power curve is poor to obtain the calibrated $P_{PDM}$ values and the P values corresponding to the $P_{PDM}$ values. Here, the larger and smaller $P_{PDM}$ selection intervals are a relative concept and can be set according to the specific condition of debugging, for example, when the smaller $P_{PDM}$ selection interval is set as 1, the larger $P_{PDM}$ selection interval may be set as more than 1.

Specifically, during a scanning calibration, fine scanning calibration is performed by a smaller $P_{PDM}$ scanning step at first, and a pair of $P_{PDM}$ value and P value is obtained from a series of calibration data obtained through the fine scanning, when the current $P_{PDM}$ value enters the power hot point range, if the current $P_{PDM}$ value enters the $k^{th}$ power hot point range for the first time, the current $P_{PDM}$ selection interval is replaced with the $P_{PDM}$ selection interval of the $k^{th}$ power hot point, the flag is set as 1, and the next pair of fine scanning $P_{PDM}$ value and P value is selected according to the $P_{PDM}$ selection interval of the $k^{th}$ power hot point; if the current $P_{PDM}$ value does not enter the $k^{th}$ power hot point range for the first time, the next pair of $P_{PDM}$ value and P value is selected according to the current $P_{PDM}$ selection interval; and when the current $P_{PDM}$ value does not enter the power hot point range, if the current $P_{PDM}$ value just goes out of the $k^{th}$ power hot point range, the currently used $P_{PDM}$ selection interval of the power hot point is replaced with the $P_{PDM}$ selection interval of the current gain, the flag is set as 0, and the next pair of fine scanning $P_{PDM}$ value and P value is selected according to the $P_{PDM}$ selection interval of the current gain; if the current $P_{PDM}$ value does not just go out of the $k^{th}$ power hot point range, the next pair of $P_{PDM}$ value and P value is selected according to the current $P_{PDM}$ selection interval, wherein the $P_{PDM}$ selection interval of the power hot point is less than the $P_{PDM}$ selection interval of the current gain.

Step 203: The obtained P values are converted into $P_{AGC}$ values recognizable by the mobile terminal, and the $P_{AGC}$ values and the $P_{PDM}$ values corresponding to the $P_{AGC}$ values are stored into the memory specified by the mobile terminal.

The method of the embodiment of the disclosure will be described below through specific embodiments in detail.

In a first embodiment, a variable-step scanning method is adopted for calibration, i.e., a larger step is adopted for coarse scanning where the radio frequency transmission linearity of the mobile terminal is good, while a smaller step is adopted for fine scanning where the linearity is poor, i.e., within the power hot point range. The values obtained by the calibration are stored in the memory specified by the mobile terminal.

The radio frequency calibration method for the mobile terminal specifically includes steps as follows.

Step 3.1: A radio frequency calibration related parameter is set.

In the step, the set related parameter includes: a gain level (N), a working mode of a gain of each level (R[i]), a $P_{PDM}$ scanning start-stop range ($P_{PDM}$ [i](start), $P_{PDM}$ [i] (stop)) corresponding to the gain of each level, a $P_{PDM}$ scanning step (Step [i]) corresponding to the gain of each level, a power hot point range (HotPoint[k](start), HotPoint[k](stop)), and a power hot point $P_{PDM}$ scanning Step (HotStep[k]), wherein i represents different gain levels, i=0, 1, . . . N−1, and k represents an ordinal number of a power hot point, k=1, 2, . . . .

Step 3.2: The working mode of the current gain is set, and the $P_{PDM}$ scanning start-stop range corresponding to the gain of the current level is obtained.

Step 3.3: A calibration program sends an initial $P_{PDM}$ value to the mobile terminal so that the mobile terminal transmits a radio frequency signal to the outside, and the calibration program controls an integrated tester to measure and obtain the power P of the signal from the mobile terminal.

Step 3.4: It is judged whether the current $P_{PDM}$ value enters the power hot point range, if the current $P_{PDM}$ value enters the power hot point range, it is judged whether the $P_{PDM}$ value of the current gain enters the $k^{th}$ power hot point range for the first time, if the $P_{PDM}$ value of the current gain enters the $k^{th}$ power hot point range for the first time, Step 3.5 is executed, if the $P_{PDM}$ value of the current gain does not enter the $k^{th}$ power hot point range for the first time, step 3.7 is executed; and if the current $P_{PDM}$ value does not enter the power hot point range, Step 3.6 is executed.

In the step, it is possible to judge whether the $P_{PDM}$ value of the current gain enters the power hot point range by the set power hot point range. When the $P_{PDM}$ value of the current gain enters the $k^{th}$ power hot point range, a flag can be set to judge whether the current $P_{PDM}$ value enters the power hot point range for the first time, for example, when the flag is 0, it means that the current $P_{PDM}$ value enters the power hot point range for the first time; and when the flag is not 0, it means that the last $P_{PDM}$ value has entered the power hot point range.

Step 3.5: The current $P_{PDM}$ scanning step is replaced with the $P_{PDM}$ scanning step of the $k^{th}$ power hot point, the flag is set as 1, which means that the current $P_{PDM}$ value has entered the power hot point, and then Step 3.7 is executed.

Step 3.6: It is judged whether the current $P_{PDM}$ value just goes out of the $k^{th}$ power hot point range, if the current $P_{PDM}$ value just goes out of the $k^{th}$ power hot point range, the currently used $P_{PDM}$ scanning step of the power hot point is replaced with the $P_{PDM}$ scanning step of the current gain, the flag is set as 0, which means that the $P_{PDM}$ value goes out of the power hot point, otherwise, Step 3.7 is executed.

In the step, if the current flag is not 0, it means that the current $P_{PDM}$ value just goes out of the $k^{th}$ power hot point range, and if the flag is 0, it means that the current $P_{PDM}$ value does not enter the $k^{th}$ power hot point range yet, and then Step 3.7 is executed.

Step 3.7: The next pair of $P_{PDM}$ and P values is set according to the current $P_{PDM}$ scanning range.

Step 3.8: It is judged whether the $P_{PDM}$ scanning range of the current gain is ended, if the $P_{PDM}$ scanning range of the current gain is ended, Step 3.9 is executed, otherwise, Step 3.4 is circulated to continue the scanning calibration of the current gain.

Step 3.9: It is judged whether calibration of gains of N levels has been completed, if the calibration of the gains of N levels has not been completed, Step 3.2 is circulated and the scanning calibration of the gain of next level is performed according to the currently used $P_{PDM}$ step, otherwise, 3.10 is executed.

In the step, if the current gain level i is less than N, it means that the calibration has not been completed; and when i is more than or equal to N, it means that the calibration has been completed.

Step 3.10: Each obtained power P is converted into the $P_{AGC}$ value recognizable by the mobile terminal, the $P_{AGC}$ value recognizable by the mobile terminal is assigned to an array Master, and written into the memory specified by the mobile terminal, moreover, the $P_{PDM}$ value corresponding to the $P_{AGC}$ value is written into the memory specified by the mobile terminal.

In the embodiment, a linear table which is most approximate to L' in size can be finally obtained by rationally setting the $P_{PDM}$ scanning step of each gain and the scanning step within each power hot point range.

In a second embodiment, a smaller $P_{PDM}$ scanning step is adopted for calibration and then part of data are selected from all the calibration data by using different selection intervals according to the linearity of a power curve, and the part of data are written into the memory of the mobile terminal.

In the embodiment, the measurement of the calibration data can adopt the related art, and selection is performed in the measured calibration data, with the selection principle as follows:

(1) a dynamic range of the PA gain of each level set by the mobile terminal is required to be covered, with some allowance left in the top and bottom limit;

(2) a sparser $P_{PDM}$ scanning step is adopted for selection where the radio frequency transmission linearity of the mobile terminal is good, while a denser $P_{PDM}$ scanning step is adopted for selection where the linearity is poor, i.e., within the power hot point range;

(3) the selected $P_{PDM}$ value corresponds to the power value one by one;

(4) the length of the selected data cannot be more than the size L' of the memory space for storing the $P_{PDM}$ value and Master data in the memory of the mobile terminal; and (5) on the basis of ensuring the second and fourth conditions, the data are selected as densely as possible to obtain a linear table whose size is the most approximate to L'.

The calibration method adopted in the embodiment is the same as that as shown in Steps 101 to 107 in FIG. 1. The scanning step here is set to be as small as possible to achieve the aim of fine scanning. Subsequently, the final calibration data P' and $P_{PDM}'$ may be selected from the fine scanning calibration data P and $P_{PDM}$ according to the change of the slope of the power curve, obtained by fine scanning, of the gain of each level, specifically: when the slope of the curve changes, it means that the linearity changes, a dense selection may be performed at a smaller interval near the points where the power curve changes; a sparse selection is performed in other places at a larger interval; and the more the slope changes, the smaller the selection interval is.

More selection methods can be adopted during specific implementation, and shall fall within the scope of the disclosure as long as the selection methods adopt the principle of selection at different intervals. In the embodiment, the selection of the calibration data includes the following steps.

Step 4.1: The $P_{PDM}$ and P obtained from the fine scanning calibration, a $P_{PDM}$ selection interval (Step [i]) corresponding to the gain of each level, a PA power hot point range (HotPoint[k](start), HotPoint[k](stop)), and a hot point $P_{PDM}$ selection interval (HotStep[k]) are obtained.

In the step, the value of the $P_{PDM}$ selection interval corresponding to the gain of each level is equal to that of the preset $P_{PDM}$ scanning step (Step [i]) corresponding to the gain of each level, and the value of the power hot point $P_{PDM}$ selection interval is equal to that of the preset power hot point $P_{PDM}$ scanning step (HotStep[k]).

Step 4.2: the current gain working mode is set, and the $P_{PDM}$ selection interval corresponding to the gain of the level and the first pair of $P_{PDM}$ value and P value obtained from the fine scanning calibration under the gain of the level is obtained.

Step 4.3: It is judged whether the current $P_{PDM}$ value enters the power hot point range, if the current $P_{PDM}$ value enters the power hot point range, Step 4.4 is executed, otherwise, Step 4.6 is executed.

Step 4.4: It is judged whether the current $P_{PDM}$ value enters the $k^{th}$ power hot point range for the first time, if the current $P_{PDM}$ value enters the $k^{th}$ power hot point range for the first time, Step 4.5 is executed, otherwise, Step 4.8 is executed.

In the step, if the flag is 0, it means that the current $P_{PDM}$ value enters the power hot point range for the first time, and then Step 4.5 is executed; if the flag is not 0, it means that the last $P_{PDM}$ scanning has entered the power hot point range, and then Step 4.8 is directly executed.

Step 4.5: The current $P_{PDM}$ selection interval is replaced with the $P_{PDM}$ selection interval of the $k^{th}$ power hot point, the flag is set as 1, which means that the $P_{PDM}$ of the current gain has entered the power hot point, and Step 4.8 is executed.

Step 4.6: It is judged whether the current $P_{PDM}$ value just goes out of the $k^{th}$ power hot point range, if the current $P_{PDM}$ value just goes out of the $k^{th}$ power hot point range, Step 4.7 is executed, otherwise, Step 4.8 is executed.

In the step, if the flag is not 0, it means that the current $P_{PDM}$ scanning cycle just goes out of the $k^{th}$ power hot point range, and Step 4.7 is executed; and if the flag is 0, it means that the current $P_{PDM}$ scanning cycle does not enter the $k^{th}$ power hot point range, and Step 4.8 is directly executed.

Step 4.7: The currently used $P_{PDM}$ selection interval of the power hot point is replaced with the $P_{PDM}$ selection interval of the current gain, and the flag is set as 0, which means that the $P_{PDM}$ value goes out of the power hot point.

Step 4.8: The next pair of $P_{PDM}$ value and P value is selected according to the current $P_{PDM}$ selection interval.

Step 4.9: It is judged whether the selection of the $P_{PDM}$ value of the current gain has been completed, if the selection of the $P_{PDM}$ value of the current gain has been completed, Step 4.10 is executed, otherwise, return to Step 4.3.

Step 4.10: It is judged whether the selection of gains of N levels has been completed, if the selection of gains of N levels has been completed, the selected P' is converted into the $P_{AGC}$ value recognizable by the mobile terminal, the $P_{AGC}$ value is assigned to an array Master, and the $P_{PDM}'$ and $P_{AGC}$ values are correspondingly stored into the memory specified by the mobile terminal; otherwise, enter the gain of the next level and return to Step 4.2.

In the step, the selection process of the calibration data is similar to the measurement method of the calibration data in the first embodiment, in which a short step is adopted for data selection in the hot point power range, while a large step is adopted for data selection in other ranges, so that the linear table written in the memory of the mobile terminal is approximate to the memory space L' of the mobile terminal as much as possible, to ensure the transmission index of the mobile terminal.

Figure 3:
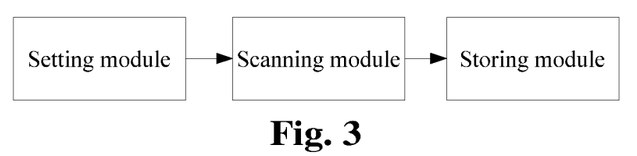
FIG. 3 is a diagram showing the composition of a radio frequency calibration apparatus for a mobile terminal in an embodiment of the disclosure.

In order to implement the method, an embodiment of the disclosure further provides a radio frequency calibration apparatus for a mobile terminal, as shown in FIG. 3, including: a setting module, a scanning module and a storing module, wherein the setting module is configured to set a parameter required for calibration of the mobile terminal;

the scanning module is configured to obtain $P_{PDM}$ values and P values corresponding to the $P_{PDM}$ values by using different scanning steps according to linearity of a power curve, or, select, by using different selection intervals, part of $P_{PDM}$ values and P values corresponding to the part of $P_{PDM}$ values from calibration data obtained by fine scanning; and the storing module is configured to convert the obtained P values into $P_{AGC}$ values recognizable by the mobile terminal, and store the $P_{AGC}$ values and the $P_{PDM}$ values corresponding to the $P_{AGC}$ values into a memory of the mobile terminal.

Here, the parameter required for the radio frequency calibration set by the setting module includes: a gain level (N), a working mode of a gain of each level (RN), a $P_{PDM}$ scanning start-stop range ($P_{PDM}$[i] (start), $P_{PDM}$[i] (stop)) corresponding to the gain of each level, a $P_{PDM}$ scanning step (Step [i]) corresponding to the gain of each level, a power hot point range (HotPoint[k](start), HotPoint[k](stop)), and a power hot point $P_{PDM}$ scanning step (HotStep[k]), wherein N is a natural number, i represents different gain levels, i=0, 1, ..., N−1, and k represents an ordinal number of a power hot point and is a natural number.

The scanning module obtains the calibrated $P_{PDM}$ values and the P values corresponding to the $P_{PDM}$ values by using different $P_{PDM}$ scanning steps, specifically: the $P_{PDM}$ scanning steps change along with the change of the linearity of a power curve, and the calibrated $P_{PDM}$ values and the P values corresponding to the $P_{PDM}$ values are obtained according to the $P_{PDM}$ scanning steps.

The scanning module selects, by using different $P_{PDM}$ selection intervals, the calibrated $P_{PDM}$ values and the P values corresponding to the $P_{PDM}$ values from the calibration data obtained by the fine scanning, specifically: the $P_{PDM}$ selection intervals change along with the change of the linearity of a power curve, and the calibrated $P_{PDM}$ values and the P values corresponding to the $P_{PDM}$ values are obtained according to the $P_{PDM}$ selection intervals.

The scanning module obtains the calibrated $P_{PDM}$ values and the P values corresponding to the $P_{PDM}$ values by using different $P_{PDM}$ scanning steps, specifically: during a scanning calibration, when a current $P_{PDM}$ value enters a power hot point range, if the current $P_{PDM}$ value enters the $k^{th}$ power hot point range for the first time, the current $P_{PDM}$ scanning step is replaced with the $P_{PDM}$ scanning step of the $k^{th}$ power hot point, the flag is set as 1, and the $P_{PDM}$ value for the next calibration is set according to the $P_{PDM}$ scanning step of the $k^{th}$ power hot point; and if the current $P_{PDM}$ value does not enter the $k^{th}$ power hot point range for the first time, the $P_{PDM}$ value for the next calibration is set according to the current $P_{PDM}$ scanning step; and when the current $P_{PDM}$ value does not enter the power hot point range, if the current $P_{PDM}$ value just goes out of the $k^{th}$ power hot point range, the current power hot point $P_{PDM}$ scanning step is replaced with the $P_{PDM}$ scanning step of the current gain, the flag is set as 0, and the $P_{PDM}$ value for the next calibration is set according to the $P_{PDM}$ scanning step of the current gain; and if the current $P_{PDM}$ value does not just go out of the $k^{th}$ power hot point range, the $P_{PDM}$ value for the next calibration is set according to the current $P_{PDM}$ scanning step.

The scanning module selects, by using different $P_{PDM}$ selection intervals, the calibrated $P_{PDM}$ values from the calibration data obtained by the fine scanning, specifically:

during a scanning calibration, fine scanning calibration is performed by using a smaller $P_{PDM}$ scanning step at first, and a pair of $P_{PDM}$ value and P value is obtained from a series of calibration data obtained by the fine scanning, when the current $P_{PDM}$ value enters the power hot point range, if the current $P_{PDM}$ value enters the $k^{th}$ power hot point range for the first time, the current $P_{PDM}$ selection interval is replaced with the $P_{PDM}$ selection interval of the $k^{th}$ power hot point, the flag is set as 1, and the next pair of $P_{PDM}$ value and P value is selected according to the $P_{PDM}$ selection interval of the $k^{th}$ power hot point; and if the current $P_{PDM}$ value does not enter the $k^{th}$ power hot point range for the first time, the next pair of $P_{PDM}$ value and P value is selected according to the current $P_{PDM}$ selection interval; and when the current $P_{PDM}$ value does not enter the power hot point range, if the current $P_{PDM}$ value just goes out of the $k^{th}$ power hot point range, the currently used $P_{PDM}$ selection interval of the power hot point is replaced with the $P_{PDM}$ selection interval of the current gain, the flag is set as 0, and the next pair of $P_{PDM}$ value and P value is selected according to the $P_{PDM}$ selection interval of the current gain; and if the current $P_{PDM}$ value does not just go out of the $k^{th}$ power hot point range, the next pair of $P_{PDM}$ value and P value is selected according to the current $P_{PDM}$ selection interval.

The $P_{PDM}$ scanning step of the power hot point is less than the $P_{PDM}$ scanning step of the current gain; and the $P_{PDM}$ selection interval of the power hot point is less than the $P_{PDM}$ selection interval of the current gain.

Through the solution of the embodiments of the disclosure, by repetitive debugging by different $P_{PDM}$ scanning steps or at different $P_{PDM}$ selection intervals, the finally obtained calibration data are more approximate to the memory space of the mobile terminal in length, so that the mobile terminal can transmit correct power by querying the calibration data when transmitting power to the outside, thereby reflecting the output characteristics of the mobile terminal more truly and improving the radio frequency output index, such as inner-loop power control, of the mobile terminal.

The above are only preferred embodiments of the disclosure, and not intended to limit the scope of protection of the disclosure; and any modifications, equivalent replacements, improvements and the like within the principle of the disclosure shall fall within the scope of protection of the disclosure.

What is claimed is:

1. A radio frequency calibration method for a mobile terminal, comprising setting a parameter required for radio frequency calibration of the mobile terminal, wherein the set parameter required for the radio frequency calibration comprises: a gain level (N), a working mode of a gain of each level (R[i]), a $P_{PDM}$ scanning start-stop range ($P_{PDM}$ [i] (start), $P_{PDM}$ [i] (stop)) corresponding to the pain of each level, a $P_{PDM}$ scanning step (Step [i]) corresponding to the gain of each level, a power hot point range (HotPoint[k](start), HotPoint[k](stop)), and a power hot point $P_{PDM}$ scanning step (HotStep[k]), wherein N is a natural number, i represents different gain levels, i=0, 1, . . . N−1, and k represents an ordinal number of a power hot point and is a natural number; and further comprising:

obtaining $P_{PDM}$ values of power control signals and actual output power (P) values of the mobile terminal corresponding to the $P_{PDM}$ values by using different scanning steps according to linearity of a power curve, or, selecting, by using different selection intervals, part of $P_{PDM}$ values and P values corresponding to the part of $P_{PDM}$ values from calibration data obtained by fine scanning; and converting the obtained P values into $P_{AGC}$ values recognizable by the mobile terminal, and storing the $P_{AGC}$ values and the $P_{PDM}$ values corresponding to the $P_{AGC}$ values into a memory of the mobile terminal.

2. The method according to claim 1, wherein using different scanning steps according to the linearity of the power curve is that: a $P_{PDM}$ scanning step changes along with change of the linearity of the power curve, and the better the linearity of the power curve is, the larger the $P_{PDM}$ scanning step is; and using different selection intervals according to the linearity of the power curve is: a $P_{PDM}$ selection interval changes along with the change of the linearity of the power curve, and the better the linearity of the power curve is, the larger the $P_{PDM}$ selection interval is.

3. The method according to claim 2, wherein obtaining the $P_{PDM}$ values and the P values corresponding to the $P_{PDM}$ values by using different scanning steps is: during scanning calibration, when a current $P_{PDM}$ value enters a power hot point range, if the current $P_{PDM}$ value enters the $k^{th}$ power hot point range for the first time, replacing a current $P_{PDM}$ scanning step with a $P_{PDM}$ scanning step of the $k^{th}$ power hot point, setting a flag as 1, and setting a $P_{PDM}$ value for the next calibration according to the $P_{PDM}$ scanning step of the $k^{th}$ power hot point; if the current $P_{PDM}$ value does not enter the $k^{th}$ power hot point range for the first time, setting the $P_{PDM}$ value for the next calibration according to the current $P_{PDM}$ scanning step; and when the current $P_{PDM}$ value does not enter the power hot point range, if the current $P_{PDM}$ value just goes out of the $k^{th}$ power hot point range, replacing a currently used $P_{PDM}$ scanning step of a power hot point with the $P_{PDM}$ scanning step of a current gain, setting the flag as 0, and setting the $P_{PDM}$ value for the next calibration according to the $P_{PDM}$ scanning step of the current gain; if the current $P_{PDM}$ value does not just go out of the $k^{th}$ power hot point range, setting the $P_{PDM}$ value for the next calibration according to the current $P_{PDM}$ scanning step.

4. The method according to claim 3, wherein the $P_{PDM}$ scanning step of the power hot point is less than the $P_{PDM}$ scanning step of the current gain; and the $P_{PDM}$ selection interval of the power hot point is less than the $P_{PDM}$ selection interval of the current gain.

5. The method according to claim 2, wherein selecting the part of $P_{PDM}$ values by using different selection intervals is:
during scanning calibration, performing fine scanning calibration at first, and obtaining a pair of $P_{PDM}$ value and P value from a series of calibration data obtained by the fine scanning, when a current $P_{PDM}$ value enters a power hot point range, if the current $P_{PDM}$ value enters the $k^{th}$ power hot point range for the first time, replacing a current $P_{PDM}$ selection interval with a $P_{PDM}$ selection interval of the $k^{th}$ power hot point, setting a flag as 1, and selecting the next pair of fine scanning $P_{PDM}$ value and P value according to the $P_{PDM}$ selection interval of the $k^{th}$ power hot point; if the current $P_{PDM}$ value does not enter the $k^{th}$ power hot point range for the first time, selecting the next pair of fine scanning $P_{PDM}$ value and P value according to the current $P_{PDM}$ selection interval; and
when the current $P_{PDM}$ value does not enter the power hot point range, if the current $P_{PDM}$ value just goes out of the $k^{th}$ power hot point range, replacing a currently used $P_{PDM}$ selection interval of a power hot point with the $P_{PDM}$ selection interval of a current gain, setting the flag as 0, and selecting the next pair of fine scanning $P_{PDM}$ value and P value according to the $P_{PDM}$ selection interval of the current gain; if the current $P_{PDM}$ value does not just go out of the $k^{th}$ power hot point range, selecting the next pair of fine scanning $P_{PDM}$ value and P value according to the current $P_{PDM}$ selection interval.

6. The method according to claim 5, wherein the $P_{PDM}$ scanning step of the power hot point is less than the $P_{PDM}$ scanning step of the current gain; and the $P_{PDM}$ selection interval of the power hot point is less than the $P_{PDM}$ selection interval of the current gain.

7. A radio frequency calibration apparatus for a mobile terminal, comprising: a setting module, a scanning module and a storing module, wherein
the setting module is configured to set a parameter required for calibration of the mobile terminal, wherein the parameter required for radio frequency calibration set by the setting module comprises: a gain level (N), a working mode of a gain of each level (R[i]), a $P_{PDM}$ scanning start-stop range ($P_{PDM}$[i] (start), $P_{PDM}$[i] (stop)) corresponding to the pain of each level, a $P_{PDM}$ scanning step (Step [i]) corresponding to the gain of each level, a power hot point range (HotPoint[k](start), HotPoint[k](stop)), and a power hot point $P_{PDM}$ scanning step (HotStep[k]), wherein N is a natural number, i represents different gain levels, i=0, 1, . . . N−1, and k represents an ordinal number of a power hot point and is a natural number;
the scanning module is configured to obtain $P_{PDM}$ values and P values corresponding to the $P_{PDM}$ values by using different scanning steps according to linearity of a power curve, or, select, by using different selection intervals, part of $P_{PDM}$ values and P values corresponding to the $P_{PDM}$ values from calibration data obtained by fine scanning; and
the storing module is configured to convert the obtained P values into $P_{AGC}$ values recognizable by the mobile terminal, and store the $P_{AGC}$ values and the $P_{PDM}$ values corresponding to the $P_{AGC}$ values into a memory of the mobile terminal.

8. The apparatus according to claim 7, wherein a $P_{PDM}$ scanning step changes along with change of the linearity of the power curve, and the better the linearity of the power curve is, the larger the $P_{PDM}$ scanning step is; and
a $P_{PDM}$ selection interval changes along with the change of the linearity of the power curve, and the better the linearity of the power curve is, the larger the $P_{PDM}$ selection interval is.

9. The apparatus according to claim 8, wherein the scanning module obtaining the $P_{PDM}$ values and the P values corresponding to the $P_{PDM}$ values by using different $P_{PDM}$ scanning steps is: during scanning calibration, when a current $P_{PDM}$ value enters a power hot point range, if the current $P_{PDM}$ value enters the $k^{th}$ power hot point range for the first time, replacing a current $P_{PDM}$ scanning step with a $P_{PDM}$ scanning step of the $k^{th}$ power hot point, setting a flag as 1, and setting a $P_{PDM}$ value for the next calibration according to the $P_{PDM}$ scanning step of the $k^{th}$ power hot point; if the current $P_{PDM}$ value does not enter the $k^{th}$ power hot point range for the first time, setting the $P_{PDM}$ value for the next calibration according to the current $P_{PDM}$ scanning step; and
when the current $P_{PDM}$ value does not enter the power hot point range, if the current $P_{PDM}$ value just goes out of the $k^{th}$ power hot point range, replacing a currently used $P_{PDM}$ scanning step of a power hot point with the $P_{PDM}$ scanning step of a current gain, setting the flag as 0, and setting the $P_{PDM}$ value for the next calibration according to the $P_{PDM}$ scanning step of the current gain; if the current $P_{PDM}$ value does not just go out of the $k^{th}$ power hot point range, setting the $P_{PDM}$ value for the next calibration according to the current $P_{PDM}$ scanning step.

10. The apparatus according to claim 9, wherein the $P_{PDM}$ scanning step of the power hot point is less than the $P_{PDM}$ scanning step of the current gain; and the $P_{PDM}$ selection interval of the power hot point is less than the $P_{PDM}$ selection interval of the current gain.

11. The apparatus according to claim 8, wherein the scanning module selecting, by using different selection intervals, the part of $P_{PDM}$ values from the calibration data obtained by the fine scanning is:
during scanning calibration, performing fine scanning calibration at first, and obtaining a pair of $P_{PDM}$ value and P value from a series of calibration data obtained by the fine scanning, when a current $P_{PDM}$ value enters a power hot point range, if the current $P_{PDM}$ value enters the $k^{th}$ power hot point range for the first time, replacing a current $P_{PDM}$ selection interval with a $P_{PDM}$ selection interval of the $k^{th}$ power hot point, setting a flag as 1, and selecting the next pair of fine scanning $P_{PDM}$ value and P value according to the $P_{PDM}$ selection interval of the $k^{th}$ power hot point; if the current $P_{PDM}$ value does not enter the $k^{th}$ power hot point range for the first time, selecting the next pair of fine scanning $P_{PDM}$ value and P value according to the current $P_{PDM}$ selection interval; and
when the current $P_{PDM}$ value does not enter the power hot point range, if the current $P_{PDM}$ value just goes out of the $k^{th}$ power hot point range, replacing a currently used $P_{PDM}$ selection interval of a power hot point with the $P_{PDM}$ selection interval of a current gain, setting the flag as 0, and selecting the next pair of fine scanning $P_{PDM}$ value and P value according to the $P_{PDM}$ selection interval of the current gain; if the current $P_{PDM}$ value does not just go out of the $k^{th}$ power hot point range, selecting the next pair of fine scanning $P_{PDM}$ value and P value according to the current $P_{PDM}$ selection interval.

12. The apparatus according to claim 11, wherein the $P_{PDM}$ scanning step of the power hot point is less than the $P_{PDM}$ scanning step of the current gain; and the $P_{PDM}$ selection interval of the power hot point is less than the $P_{PDM}$ selection interval of the current gain.

\* \* \* \* \*

UNITED STATES PATENT AND TRADEMARK OFFICE
CERTIFICATE OF CORRECTION

PATENT NO. : 8,855,574 B2
APPLICATION NO. : 13/881743
DATED : October 7, 2014
INVENTOR(S) : Cheng Liu Page 1 of 1

It is certified that error appears in the above-identified patent and that said Letters Patent is hereby corrected as shown below:

In the Claims

Column 12, line 24, change "pain" to --gain--.
Column 13, line 57, change "pain" to --gain--.

Signed and Sealed this
Thirtieth Day of December, 2014

Michelle K. Lee
*Deputy Director of the United States Patent and Trademark Office*